March 18, 1924.                                                    1,487,435
V. BREEZE
CONTROL DEVICE FOR ELECTRICALLY DRIVEN LIFTS, CRANES, WINCHES,
AND LIKE APPARATUS FOR DEALING WITH VARIABLE LOADS
Filed Aug. 24, 1920
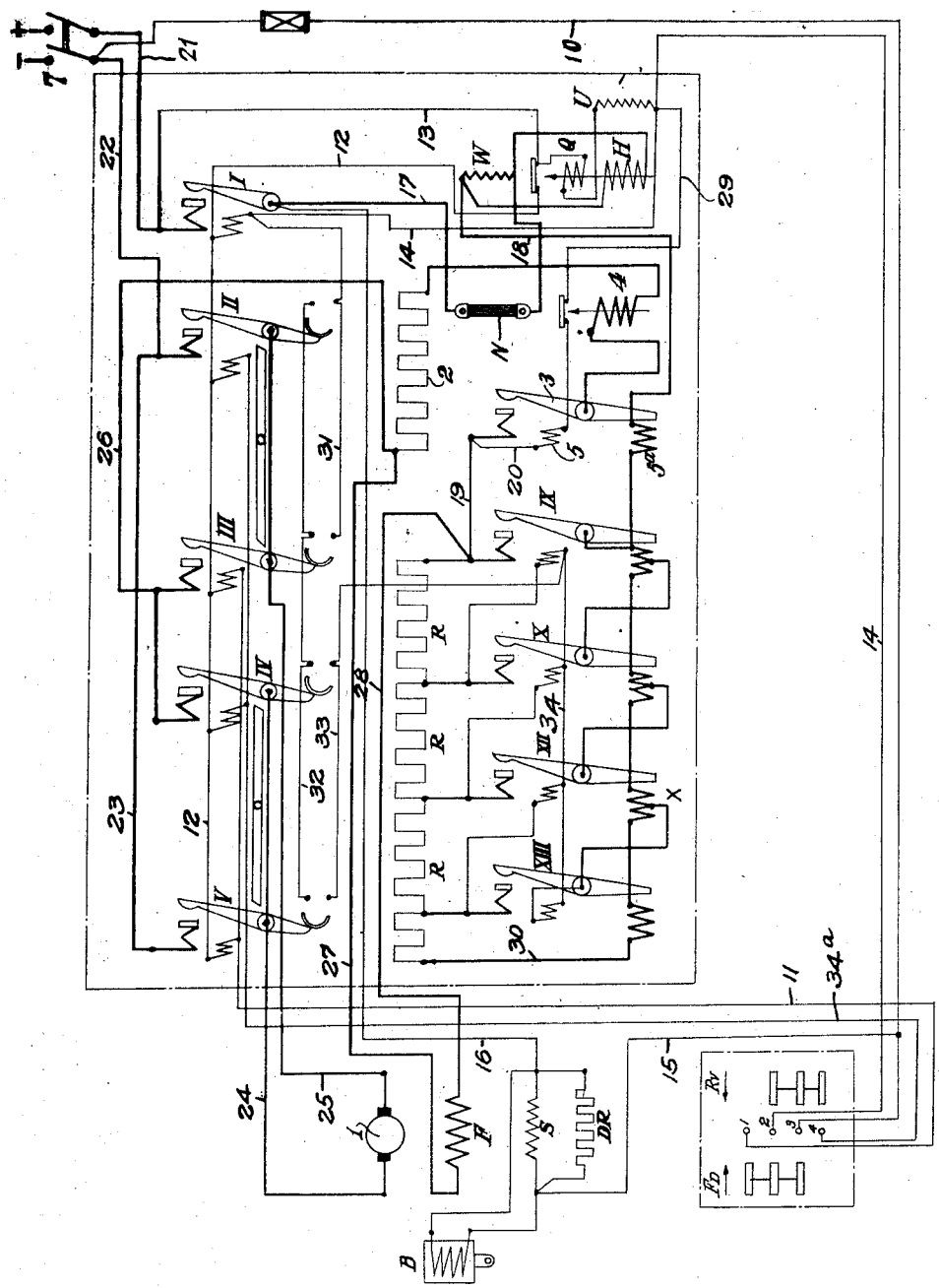
Inventor.
Victor Breeze,
By- B. Anger,
Atty Patented Mar. 18, 1924.

1,487,435

UNITED STATES PATENT OFFICE.

VICTOR BREEZE, OF BRIGHTON, ENGLAND.

CONTROL DEVICE FOR ELECTRICALLY-DRIVEN LIFTS, CRANES, WINCHES, AND LIKE APPARATUS FOR DEALING WITH VARIABLE LOADS.

Application filed August 24, 1920. Serial No. 405,647.

*To all whom it may concern:*

Be it known that I, VICTOR BREEZE, a subject of the King of Great Britain, and resident of Brighton, in the county of Sussex, England, have invented certain new and useful Improvements in and Connected with Control Devices for Electrically-Driven Lifts, Cranes, Winches, and Like Apparatus for Dealing with Variable Loads, of which the following is a specification.

This invention relates to control devices for electrically driven winches, cranes, lifts and the like and has for its object to provide a means for automatically ensuring high speeds of running on light loads and the invention consists essentially of a light load accelerating device comprising a current limit lockout switch for controlling the circuit of the lockout switch.

I have illustrated my invention in the accompanying diagram.

In accordance with the invention and referring to the diagram I propose to provide a series motor 1 with a field diverted resistance 2 under control of a lockout switch 3 which operates to insert the resistance and weaken the field to speed up the motor only when the load on the motor and current conditions render this desirable, and I propose to provide an overload relay 4 in the circuit of the lockout switch 3 so that in the event of increase of load the circuit of the operating coil 5 of the lockout switch will be broken and the lockout switch 3 will open to cut the diverter field resistance 2 out and strengthen the motor field again.

Thus the operation in general is as follows:—

For starting the motor, switch 7 is closed and the master drum controller M is turned either to the right or left according as forward or reverse operation of the motor is required. Supposing it to be turned to the right for forward operation, the fixed contacts 1, 2 and 3 are bridged, the closing windings of switches I, III and V are energized and said switches closed. The circuit energizing switches III and V may be traced from the negative pole of the switch 7 by conductor 10, to and through fixed contacts 3 and 1 of drum controller M, by conductor 11, to and through the energizing circuits of the said switches V and III in parallel, by conductor 12, through the contacts of the overload relay HQ and by conductor 13 to the positive pole of said switch 7.

The circuit energizing the winding of switch I is in shunt with the circuit detailed above, and may be traced from the negative pole of switch 7 to fixed contact 3 as before, and thence to fixed contact 2 of said drum controller, by conductor 14, to and through the energizing circuit of the switch I by conductor 12 and to the negative pole of switch 7 as before. Switches I, III and V thereupon close and the main motor circuit is completed through the motor armature 1 and series field F, such circuit being traceable from the negative pole of switch 7, by conductors 22 and 23 to and through switch V, by conductor 24, to and through the motor armature 1, by conductor 25 to and through switch III, by conductors 26 and 27 to and through the series field F of the motor, by conductor 28 through the resistance sections R, R, R by conductor 30 through the lockout windings of switches XIII, XII, X and IX, to and through the lockout winding 5ª of the switch 3, by conductor 18, through time lag shunt W and overload relay winding H in parallel, through fuse N by conductor 17 to and through switch I and by conductor 21 to the positive pole of switch 7.

A shunt circuit is also completed for the winding 5, such circuit following the said main armature field circuit from the negative pole of switch 7 to the conductor 28 and there separating and going to the positive pole of said switch 7 by conductor 19 to and through winding 5, to and through contacts of overload relay 4, by conductor 29 to and through resistance unit U and resetting coil Q of overload relay and by conductors 13 and 21 to the positive terminal of switch 7.

From the above it will be seen that upon closure of switch 7 and operation of controlling drum M, the coils 5 and 5ª of the lockout switch are energized so that said switch will be held open until the current falls to a predetermined value. Closure of switches III and V effects closure of auxiliary contacts of said switches and completes a circuit from negative pole of switch 7 through conductor 10 to fixed contact 3 of the drum controller, by conductors 14 and 31, through auxiliary contacts of switch III by conductor 32 through auxiliary contacts of switch V through conductors 33 and 34, to and through closing windings in parallel of switches XIII, XII, X and IX to point X of lockout winding of switch XII and so to the positive pole of switch 7 by way of the path of the circuit of the main motor armature and series field windings.

As the motor speeds up the lockout switch XIII closes when the current falls to a predetermined point, thereby shortcircuiting the left hand end section of the resistance R, R, R together with its own lockout winding and part of the lockout winding of switch XII, which switch closes thereupon, either after a time limit or in response to a further fall in the motor circuit as may be desired in a manner which will be understood to those skilled in the art, and in closing the said switch in turn short-circuits the next resistance section together with its own lockout winding and a portion of the lockout winding of switch X and so on until all the resistance sections of resistance R, R, R are excluded from the circuit. During and subsequent to the whole of the above described operation the coils 5 and 5ª of the lockout switch 3 will be energized and the latter will be held open if current exceeds a predetermined value. If the current drops to or below such value however the lockout switch will close and connect the resistance 2 in a circuit in parallel with the series field winding of the motor and thus speed up the motor, such circuit being traceable from the left hand terminal of said series field winding, by conductor 27 to and through said resistance 2, to and through the winding of the over-load relay 1, to and through said lockout switch 3, by conductors 19 and 28 to the right hand terminal of said series field winding. If, however, from any cause the load exceeds a predetermined value a current rise will occur in the series field and in the above described circuit which is in parallel therewith and the overload relay 4 will open to interrupt the circuit of the closing coil 5 of the lockout switch 3 which will again open to break said shunt circuit of the diverter resistance 2. Immediately following upon the closure of switch I a circuit is established whereby the shunt field S, discharge resistance DR and shunt brake B are energized. This circuit is unaffected by the subsequent operation and may be traced from the negative pole of the switch 7, by conductors 10 and 15, to and through said shunt field discharge resistance and shunt brake in parallel, by conductor 16 to and through switch I to the positive pole of said switch 7.

The operation of the overload relay will be readily understood to those skilled in the art. Thus, as before described, the overload winding H of this relay is connected, in parallel with the time lag shunt W in the main circuit of the motor, whereas the resetting coil Q is connected in the circuit of the closing winding 5 of the lockout switch 3. The winding H therefore is responsive to current surges in the motor circuit upon the occurrence of overload to open the relay against the influence of the winding Q and thus break the circuits of the switches I, III and V, and cause the same to open and interrupt the main motor circuit, the winding Q subsequently operating to reset the relay.

From the foregoing the operation of the controller for reverse will be readily understood without detail description. Thus the drum of the master controller M being turned to the left instead of the right, fixed contacts 2, 3 and 4 are bridged in place of 1, 2 and 3. The circuit energizing switch I is established through contact 3 as before, whereas energizing circuit for switches II and IV are established through contact 4 in place of the circuit for switches III and V previously established through contact 1, said circuit being traceable by conductor 34ª through windings of switches II and IV and by conductor 12 to the positive terminal as before. These switches II and IV therefore close in place of the switches III and V with the result as will be readily seen that the main motor circuit is established through the armature 1 in the reverse direction.

The auxiliary contacts of the switches II and IV will be seen to effect exactly the same connections as those of the switches III and V.

What I claim and desire to secure by Letters Patent is:—

1. In combination, an electric motor having a series field provided with a diverter resistance, an electro-magnetic overload relay switch, an electro-magnetic series field lockout switch having a closing coil, and associated leads whereby the diverting resistance is shunted across the series field coil of the motor when the lockout switch is closed, the coil of the overload relay switch being in series with the lockout switch and when the current therethrough exceeds a certain limit operates to open the circuit through the closing coil of the lockout switch to cut out the diverter resistance.

2. In combination, an electric motor having a series field provided with a diverter resistance, an electro-magnetic overload relay switch, an electro-magnetic series field lockout switch having a closing coil and fixed and movable contacts, the diverting resistance being connected across the field winding through the coil of the overload relay switch and contacts of the lockout switch when closed, the closing coil of the lockout switch being connected across the fixed contact to the relay switch, the coil of the overload relay switch being in series with the lockout switch and when the current therethrough exceeds a certain limit operates to open the circuit through the closing coil of the lockout switch to cut out the diverter resistance.

In witness whereof I affix my signature.

VICTOR BREEZE.